United States Patent
Krulls

[11] 3,903,442
[45] Sept. 2, 1975

[54] ROTATABLE BUS RINGS FOR COLLECTORS

[75] Inventor: Gerd E. Krulls, Scotia, N.Y.

[73] Assignee: General Electric Company, Schenectady, N.Y.

[22] Filed: Mar. 1, 1972

[21] Appl. No.: 230,834

[52] U.S. Cl. .............................. 310/229; 310/241
[51] Int. Cl.$^2$ ........................................ H02K 13/12
[58] Field of Search ............ 310/239, 229, 219, 230, 310/240, 241, 242, 243, 178

[56] References Cited
UNITED STATES PATENTS

| | | | |
|---|---|---|---|
| 788,049 | 4/1905 | Johnson | 310/229 |
| 1,560,724 | 10/1925 | Potts | 310/230 UX |
| 1,770,247 | 7/1930 | Titterington | 310/241 |
| 3,432,708 | 3/1969 | Bissett | 310/239 |
| 3,480,813 | 11/1969 | Sillano | 310/241 |
| 3,519,916 | 7/1970 | Dornier | 310/219 |

FOREIGN PATENTS OR APPLICATIONS

| | | | |
|---|---|---|---|
| 461,660 | 1/1914 | France | 310/241 |

*Primary Examiner*—R. Skudy
*Attorney, Agent, or Firm*—John F. Ahern; James W. Mitchell

[57] ABSTRACT

In a dynamoelectric machine, a non-segmented, continuous, direct current brush collector ring for energizing a rotating field may be up-rated by providing additional brushes to parts of the bus ring which, in the prior art, were considered inaccessible for servicing. The bus ring is rotatably supported by the dynamoelectric machine frame. Therefore, the bus ring may be turned clockwise or counterclockwise for servicing all parts of the bus ring especially those parts which were heretofore inaccessible. Alternative means are shown for providing a continuous electrical connection from a direct current power supply to said bus ring. In one embodiment a flexible and extensible electrical cable is used; and, in the other embodiment a depending flange formed as part of the bus ring is immersed in an electrically conductive liquid metal bath.

6 Claims, 5 Drawing Figures

ROTATABLE BUS RINGS FOR COLLECTORS

BACKGROUND OF THE INVENTION

This invention relates generally to bus rings and collector rings used in large dynamoelectric machines; and, in particular, this invention relates to means for uprating a bus ring without a corresponding increase in the size of the bus ring.

Power ratings versus size limitation due to shipping constraints have become the hallmark of dynamoelectric machine design. Various approaches have been undertaken to increase dynamoelectric machine ratings without increasing the size of the dynamoelectric machine. Among these approaches are improved cooling techniques, improved insulation throughout the machine, improved support constructions and improved winding schemes. One dynamoelectric machine area for further improvement involves collector rings and bus rings utilizing carbon brush conductors. A significant improvement in collector brush rings would serve to uprate present machines and future designs.

A typical brush ring or bus ring design may use from one-third to one-half of the brush ring circumference for mounting brushes about the collector rings. As shown, in U.S. Pat. No. 3,432,708 to Bissett issued Mar. 11, 1969 and assigned to the assignee of the present invention, oftentimes only a discontinuous, horseshoe-shaped, brush ring has been used because the area below the rotor has been considered inaccessible for servicing. Therefore, no brushes were placed in that area because of the difficulty in servicing the brushes which must be regularly maintained. If a greater proportion of the bus ring could conveniently be used, then the additional brushes would contribute to an uprating of the machine and, of course, the size of the bus ring would remain the same.

SUMMARY OF THE INVENTION

A bus ring or brush collector ring may be rotatably mounted with respect to a dynamoelectric machine frame. The bus ring may be mounted on insulated rollers which are supported by the dynamoelectric machine frame around the periphery of a collector ring. Insulated mechanical or electromechanical means may be employed in selectively turning the bus ring clockwise or counterclockwise for maintenance whether or not the machine is still operating. Previously inaccessible bus ring portions are therefore made accessible. Flexible leads or a liquid metal both may be used in connecting the bus ring to a power supply.

It is therefore one object of the present invention to provide a means for uprating present dynamoelectric machine brush collector rings without increasing the size of the ring.

It is another object of the present invention to provide a means for uprating future design rings within the constraints of a shipping envelope.

It is another object of the present invention to retain the serviceability of a brush collector ring while also uprating its electrical capacity.

Other objects and advantages will become apparent from the following description of the invention, and the novel features will be particularly pointed out hereinafter in the claims.

DETAILED DESCRIPTION OF THE INVENTION

Figure 1:
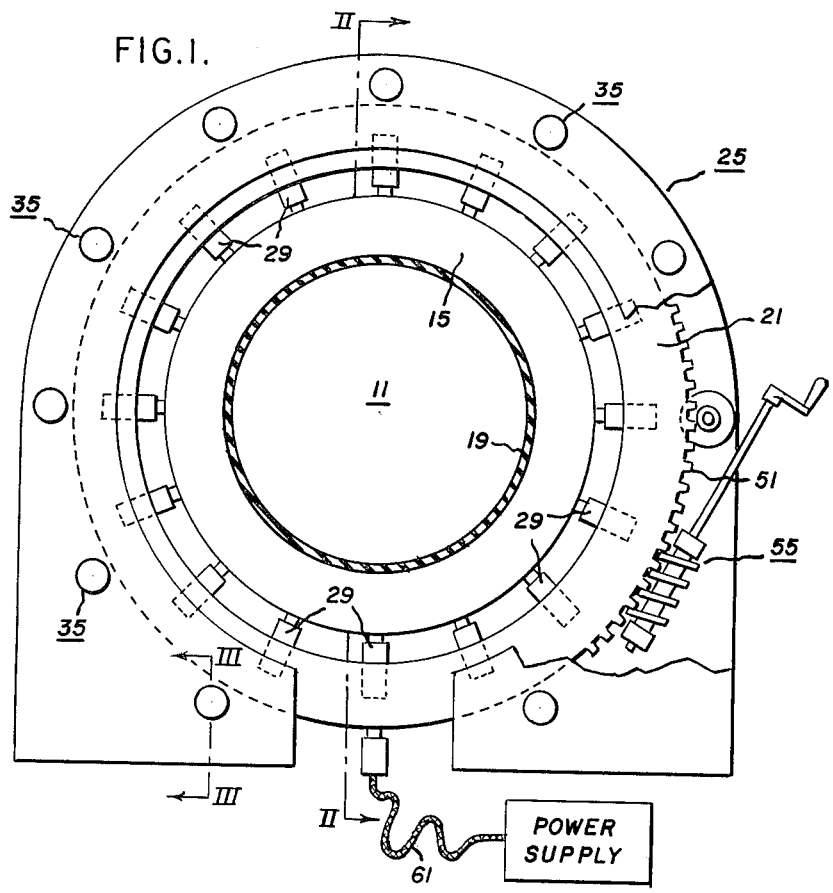
FIG. 1 is an elevation view of the collector end of a dynamoelectric machine with portion of the frame cutaway and phantom lines in order to show the present invention.

Referring to FIG. 1, a rotor 11 is girded by a collector ring 15 and is electrically isolated therefrom, by a concentric insulator 19 disposed between the collector ring and the rotor.

A brush ring or bus ring 21 is concentrically spaced from the collector ring and is rotatably mounted on the dynamoelectric machine frame 25. A number of electrically conductive carbon brushes 29 including brush holders are mounted peripherally around the bus ring and slidably contact the collector ring.

The dynamoelectric machine frame 25 at the collector ring is divided into two spaced apart, opposing supportive plates 25a and 25b. The plates are U-shaped with the rotor straddled between the legs and the curved portion of the U (FIG. 1). Additionally, the collector ring is disposed between and straddled on either side by the two plates as illustrated in FIG. 2.

Figure 2:
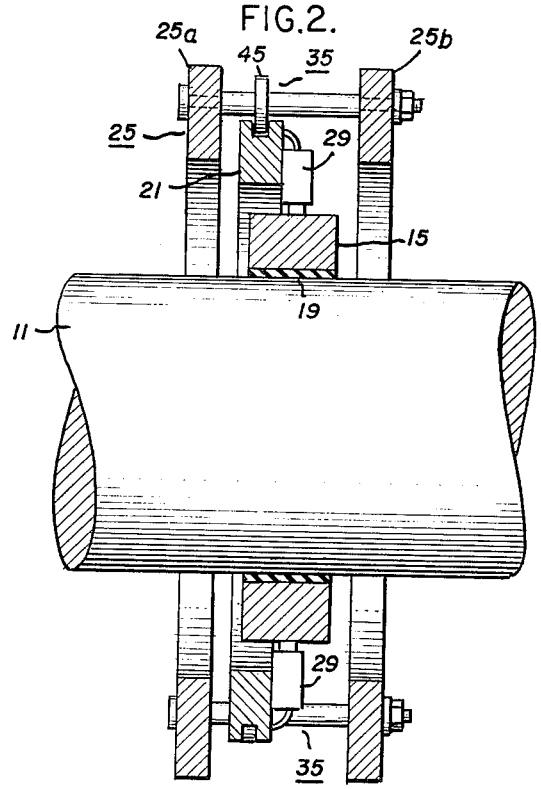
FIG. 2 is a side elevation view, (Section II—II), FIG. 1, of the dynamoelectric machine embodying the present invention.
Figure 3:
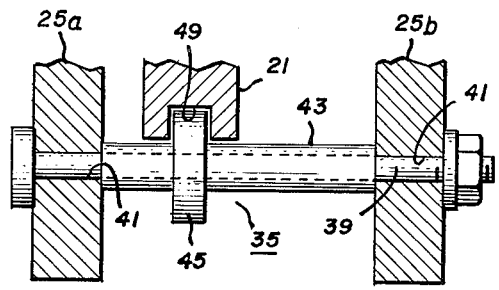
FIG. 3 is a partial side elevation view (Section III—III), FIG. 1, of a portion of the dynamoelectric machine frame and bus ring showing the manner in which the bus ring is rotatably supported by the machine frame.

Referring to FIGS. 2 and 3, the bus ring 21 is rotatably mounted with respect to the dynamoelectric machine frame including the two supportive plates 25a and 25b by means of rollers 35. Each roller is comprised of a pin 39 which fits into a journal bearing 41 in each supportive plate. An insulator sleeve 43 formed with a circumferential flange 45 is circumscribed about the pin 39.

The bus ring is formed with a circumferential groove 49. The bus ring and its circumferential groove is aligned with the circumferential flange 45 on the insulator sleeve in a tracking relation to maintain the original spacing distance between the bus ring and each supportive plate.

Figure 4:
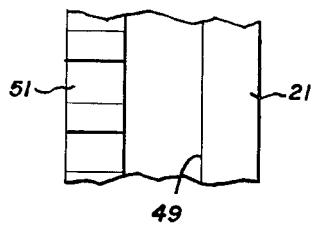
FIG. 4 is an elevation view of a portion of a bus ring.

In FIGS. 1 and 4, it may be seen that a portion of the bus ring is formed with gear teeth 51 at its periphery. This gear tooth portion cooperates with an insulated crank assembly 55 and forms a means for turning the bus ring. The gear teeth may run a circumferential distance of 30° from each side of a midpoint where the crank assembly meshes with the gear tooth portion. This should render the entire bus ring accessible for servicing.

As is shown in FIG. 1, electrical contact between the bus ring and a power supply (represented by a labeled box) is maintained by a flexible lead 61.

Figure 5:
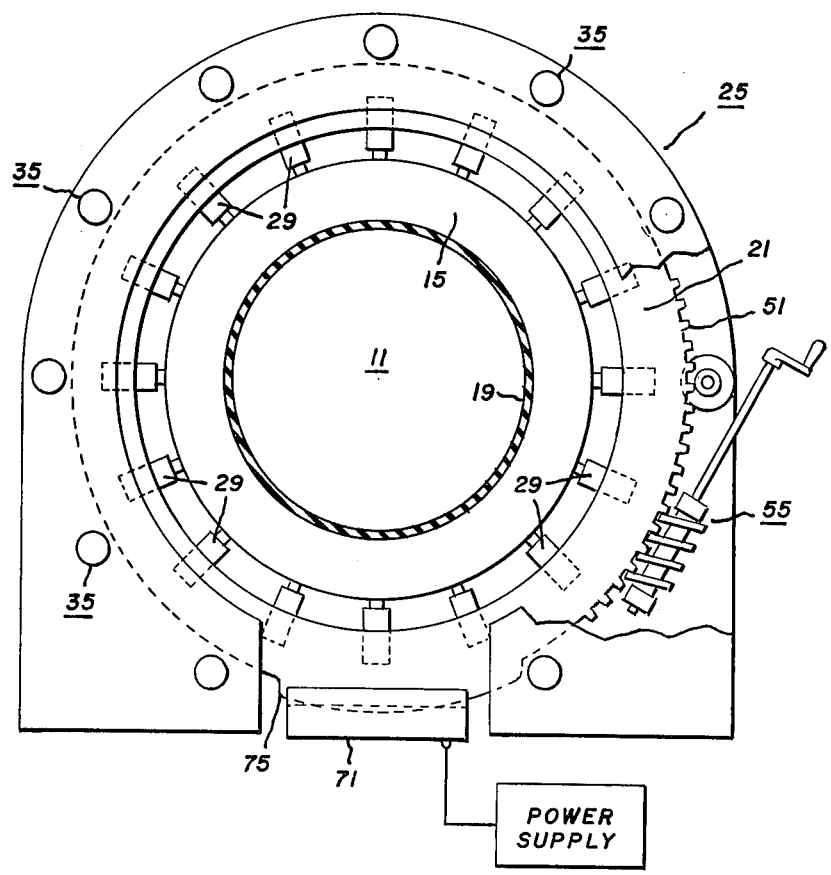
FIG. 5 is an end elevation view of a dynamoelectric machine showing an alternate embodiment of the present invention.

An alternative embodiment is shown in FIG. 5, wherein the need for a flexible lead is obviated. The dynamoelectric machine shown in FIG. 5 is identical with the machine shown in FIG. 1, and likewise, is similarly numbered except as follows. Electrical contact between a power supply and the bus ring is maintained through a liquid metal bath 71 which is electrically connected to the power supply. A dependent flange or lip 75 formed on the bus ring is always partially immersed in the liquid metal bath so that electrical contact is maintained between the bus ring and power supply.

OPERATION

The operation of the invention should be apparent from the above description of the invention. The bus ring is rotatable relative to the supportive frame so that brush maintenance may be accomplished on relatively inaccessible brushes simply by utilizing the crank assembly to rotate the inaccessible part of the ring into an accessible position. The operation of the machine may continue during routine maintenance procedures. It is therefore possible to uprate the bus ring without increasing its size by simply adding brushes into portions of the ring which were heretofore considered inaccessible.

While there is shown what is considered at present to be the preferred embodiment of the invention, it is, of course, understood that various other modifications may be made therein; and it is intended to cover in the appended claims all such modifications as fall within the true spirit and scope of the invention.

What is claimed is:

1. An improved dynamoelectric machine of the type used to generate electrical current in response to a rotating field, including a rotor having an electrically conductive, continuous collector ring rotatable therewith; an electrically conductive bus ring adjacent said collector ring including a plurality of removable, electrically conductive, brushes having the same polarity radially depending from said bus ring in sliding electrical contact with said collector ring; a direct current power supply connected to said bus ring; and, said collector ring of the type wherein the brushes may be circumferentially moved about the collector ring without changing said dynamoelectric machine characteristics; the improvement comprising:

means for rotatably supporting said bus ring adjacent said collector ring;

means for turning said bus ring about its own axis whereby portions of the bus ring heretofore inaccessible are rendered accessible for brush mounting and servicing; and means for providing continuous electric contact between said bus ring and said power supply even while said bus ring is being serviced.

2. The improvement recited in claim 1 wherein the means for rotatably supporting said bus ring include a stationary frame adjacent said collector ring having roller bearings supported thereon; said bus ring rotatably supported by said roller bearings.

3. The improvement recited in claim 2 wherein the means for turning said bus ring includes an arcuate rack formed on a portion of said bus ring through an arc of at least thirty degrees; a crank assembly, including an endless spiral meshing with said rack and mounted on said stationary frame, whereby rotation of said crank causes the bus ring to turn by means of said spiral and rack.

4. The improvement recited in claim 1 wherein the means for providing continuous electrical contact between said bus ring and said power supply includes a flexible and extensible electrical cable connecting said bus ring and power supply.

5. The improvement recited in claim 1 wherein the means for providing continuous electrical contact between said bus ring and said power supply includes a dependent, electrically conductive flange formed on said bus ring and a stationary liquid metal bath connected to said power supply, said flange immersed into said liquid metal bath.

6. An improved dynamoelectric machine, including a rotor having a collector ring concentrically mounted about its circumference; a bus ring concentrically spaced from said collector ring and having a plurality of conductive brushes circumferentially arranged about said bus ring, the brushes slidably contacting said collector ring, and a frame for supporting said bus ring; wherein the improvement comprises:

means for rotatably mounting said bus ring to said frame;

a dependent, electrically conductive flange formed on said bus ring; and, a liquid metal bath connected to an electric power supply within which said flange is immersed thereby supplying continuous electric power to said bus ring.

* * * * *